(No Model.)

E. FEIGE.
STREET RAILWAY RAIL.

No. 364,502. Patented June 7, 1887.

WITNESSES
John E. Wiles.
M. B. O'Dogherty

INVENTOR
Ernest Feige
By W. W. Leggett.
Attorney

UNITED STATES PATENT OFFICE.

ERNEST FEIGE, OF EAST SAGINAW, MICHIGAN.

STREET-RAILWAY RAIL.

SPECIFICATION forming part of Letters Patent No. 364,502, dated June 7, 1887.

Application filed December 17, 1886. Serial No. 221,881. (No model.)

*To all whom it may concern:*

Be it known that I, ERNEST FEIGE, of East Saginaw, county of Saginaw, State of Michigan, have invented a new and useful Improvement in Street-Railway Rails; and I declare the following to be a full, clear, and exact description of the same, such as will enable others skilled in the art to which it pertains to make and use it, reference being had to the accompanying drawings, which form a part of this specification.

My invention relates to a novel construction of street-railway rails; and it consists of the device hereinafter more particularly described, and more fully pointed out in the claim.

It is a well-known fact that as street-railway rails are ordinarily constructed there is very great liability for vehicles to be broken or injured in crossing the same, and especially is this likely to occur where a vehicle has been following the track, the wheels running upon the flanges of the rails, and occasion arises to turn out and off from the track. Difficulty is experienced ofttimes owing to the sharp rise of the top of the rail from the flange occasioning much strain upon a vehicle, and not infrequently causing the wheels or axles or other parts of the vehicle to be broken.

Figure 1:
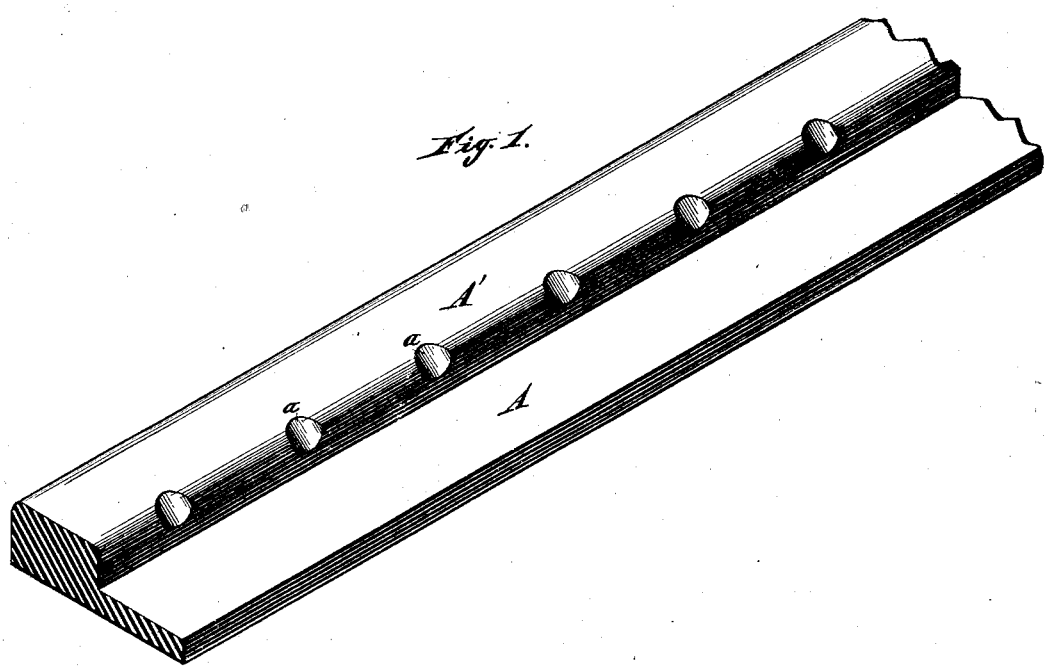
Figure 2:
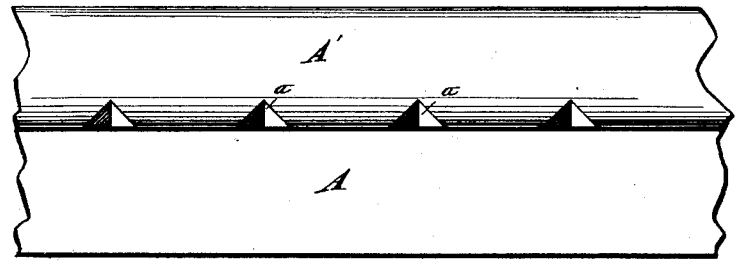

It is the particular object of my invention to remedy this difficulty by constructing a street-railway rail whereby the passage of a wheel off from the flange of the track in crossing the same or turning out therefrom may be facilitated, which I accomplish as follows:

In the drawings, Figure 1 is a view in perspective of a device embodying my invention. Fig. 2 is a plan view.

A represents the flange of the rail, and A' the tread. The tread of the rail is rounded, as in rails of ordinary construction, as shown. The inner edge of the tread of the rail is constructed with a series of indentures, as shown at *a*, located at desired intervals apart. These indentures are hollowed out from both directions toward the center, as shown in the drawings, and may be made of any desired depth in the tread of the rail. The essential feature of these indentures is, that they shall be hollowed out of the tread of the rail from both directions longitudinally of the rail toward the center of the indenture. This may be accomplished by making a curved indenture, as shown in Fig. 1, or a V-shaped indenture, as shown in Fig. 2. As so constructed it is evident that a wheel of a vehicle running upon the flange of the rail when turning to get off the track will present the outer edge of its tire to these indentures, said indentures forming contact points or bearings, against which the edges of the tire may strike and the wheel be caused to roll readily over the tread and off the track. The indentures being hollowed into the edge of the tread from both directions, the rail is adapted thus to facilitate the passage of the wheel from one direction as well as from the other. By constructing a rail with such indentures to form bearing-points for the wheel to engage upon, the strain is very materially diminished, and vehicles can pass safely from the track without liability of breakage. Moreover, it is evident that a rail constructed with said indentures on the inner edge of its rounded tread may be readily rolled in the ordinary manner, the rolls being provided with corresponding bosses or shoulders to form said indentures. The rail presents no sharp angles impracticable of formation by the rolling process, and at the same time a rail may be so formed without any additional expense whatsoever in its manufacture. These indentures, it will be seen, unlike square elongated slots, present no sharp corners, but a gradual sweep from the edge of the rail toward the center of the concavity, and hence each serves its function in guiding the wheel off the rail in either direction. The slots do not, therefore, need to be varied, but are all constructed uniformly. Moreover, being thus recessed into the rounded edge of the rail, these indentures are out of the way of the car-wheel, and are not liable in the least to impede the operation of the car-wheel thereon, as might be the case where the rail is provided with elongated slots by constructing it with divisions projecting outward from the body of the rail.

What I claim is—

A railway-rail constructed with a flange having a flat upper surface and a tread projecting therefrom, the upper edge of said tread adjacent to said flange provided with a series of indentures hollowed into the tread of the rail from said upper edge in both directions longitudinally of the rail toward the center of the indentures, said rail unserrated on the outer edge of said tread and flange, respectively, substantially as described.

In testimony whereof I sign this specification in the presence of two witnesses.

ERNEST FEIGE.

Witnesses:
ALBERT M. MARSHALL,
H. L. TURNER.